United States Patent
Takaba et al.

[11] Patent Number: 6,035,127
[45] Date of Patent: Mar. 7, 2000

[54] APPARATUS FOR CLOSING A FILM GATE IN A FILM CARTRIDGE IN A SINGLE-USE CAMERA

[75] Inventors: Tetsufumi Takaba; Masami Fujita; Shuri Mizoguchi; Masaru Yamazaki; Osamu Shibazaki; Hitoshi Ohkubo, all of Hino, Japan

[73] Assignee: Konica Corporation, Japan

[21] Appl. No.: 09/151,966

[22] Filed: Sep. 11, 1998

Related U.S. Application Data

[62] Division of application No. 08/950,265, Oct. 14, 1997, Pat. No. 5,862,427, which is a continuation of application No. 08/596,752, Feb. 5, 1996, abandoned.

[30] Foreign Application Priority Data

Feb. 7, 1995 [JP] Japan .................................. 7-043455

[51] Int. Cl.⁷ .......................... G03B 17/02; G03B 17/26
[52] U.S. Cl. .................. 396/6; 396/513; 396/536
[58] Field of Search ............... 396/6, 513, 536, 396/538, 535, 516

[56] References Cited

U.S. PATENT DOCUMENTS

| | | | |
|---|---|---|---|
| 4,812,863 | 3/1989 | Ohmura et al. | 354/219 |
| 4,896,178 | 1/1990 | Ohmura et al. | 354/145.1 |
| 5,231,438 | 7/1993 | Smart | 354/281 |
| 5,452,036 | 9/1995 | Kamata | 354/275 |
| 5,481,325 | 1/1996 | Wada et al. | 354/173.1 |
| 5,483,314 | 1/1996 | Lawther et al. | 354/174 |
| 5,495,310 | 2/1996 | Takatori | 354/288 |
| 5,506,650 | 4/1996 | Stephenson, III et al. | 354/275 |
| 5,517,270 | 5/1996 | Balling | 354/288 |
| 5,550,608 | 8/1996 | Smart et al. | 354/174 |
| 5,563,672 | 10/1996 | Fuss et al. | 396/538 |
| 5,565,951 | 10/1996 | Tokui | 396/538 |
| 5,572,272 | 11/1996 | Zander et al. | 396/513 |
| 5,587,757 | 12/1996 | Seamans et al. | 396/536 |
| 5,592,253 | 1/1997 | Nishimura et al. | 396/538 |
| 5,600,393 | 2/1997 | Funahasi | 396/513 |
| 5,602,609 | 2/1997 | Balling | 396/284 |
| 5,602,611 | 2/1997 | Takatori et al. | 396/513 |
| 5,646,712 | 7/1997 | Solomon | 396/535 |
| 6,500,705 | 3/1996 | Stephenson, III | 354/288 |

FOREIGN PATENT DOCUMENTS 8-201990  8/1996  Japan .

*Primary Examiner*—Eddie C. Lee
*Assistant Examiner*—Christopher E. Mahoney
*Attorney, Agent, or Firm*—Jordan B. Bierman; Bierman, Muselian and Lucas

[57] ABSTRACT

The single-use camera has a main body in which is housed the film cartridge and around which a cover member is formed. On the main body of the camera is a closure and a spring which are used to close the light-shield cover in the film gate of the cartridge when the cover is opened to remove the film cartridge.

2 Claims, 18 Drawing Sheets

APPARATUS FOR CLOSING A FILM GATE IN A FILM CARTRIDGE IN A SINGLE-USE CAMERA

CROSS-REFERENCE TO RELATED APPLICATIONS

This is a divisional application of U.S. patent application No. 08/950,265 filed Oct. 14, 1997, now U.S. Pat. No. 5,862,427, which, in turn, was a continuation of U.S. patent application Ser. No. 08/596,752 filed Feb. 5, 1996, now abandoned.

BACKGROUND OF THE INVENTION

This invention is related to a single-use camera in which a film cartridge is accommodated in the camera when it is assembled, a photographic film is wound every time when a photographing operation is conducted, and the photographic film is displaced when the photographic operation is finished.

The single-use-camera is a simple camera in which a film cartridge is accommodated in the camera when it is assembled, a photographic film is wound every time when a photographing operation is conducted, and the photographic film is displaced when the photographic operation is finished. For the film cartridge which is accommodated in such the single-use camera, for example, there is the one disclosed in the Japanese Patent Publication Open to the Public Inspection No. 75336/1994 in which there is provided a light-shielding cover instead of a light-shielding material such as velvet and a photographic film is drawn from the film path of the film cartridge by opening the light-shielding cover, opening the film path, and rotating the winding spool inside the film cartridge to the drawing direction.

Further, in the case of using a film cartridge equipped with a light-shielding cover at a gateway for a film, when the film cartridge is taken out in a daylight room after completion of photographing, the light-shielding cover needs to be in its closed state. In the course of handling in a photofinishing laboratory, an operator uses an exclusive jig in a daylight room to close the light-shielding cover through an operating portion to take the film cartridge out, after confirming from the torque of a film-winding knob that a photographic film is totally rewound in the film cartridge.

Because of the reason mentioned above, it is preferable that the operation section for closing the light-shielding cover is located at the position where the light-shielding cover can be closed promptly by the use of an exclusive jig in the photofinishing laboratory. However, if a user closes the light-shielding cover in the course of photographing, there is a fear that a photographic film is damaged or a camera fails to fulfill its functions.

Further, when operations of closing the light-shielding cover are forgotten for disassembling cameras in photofinishing laboratories, photographic films completed in terms of photographing are accidentally exposed to light, and a possibility of occurrence of such problems is very high in photofinishing laboratories where a large number of photographic films are processed in a day. What is worse, these operations are complicated and labor hours and a burden in photofinishing laboratories are increased, Therefore, the preferable is the constitution wherein a light-shielding cover is closed automatically after completion of photographing, and inventors of the invention accomplished an example wherein a detecting member which detects the last end of a film is provided, and an opened light-shielding cover is closed automatically by the detection of the detecting member.

SUMMARY OF THE INVENTION

This invention was invented in relation to the above-mentioned problems. The objective of the first and the second examples is to provide a single-use camera in which an unexpected opening operation of the light-shielding cover is prevented, and further, a closing operation of the light-shielding cover in a developing laboratory is easy. The objective of the third to the fifth examples is to provide a single-use camera in which accidents in a developing laboratory by not closing the light-shielding cover are prevented and discharge of the film cartridge can be conducted surely and easily without increasing operation steps.

For solving the aforementioned problems and for attaining an object, the first example of the invention is represented by a single-use camera which is loaded in advance, when it is assembled, with a film cartridge having a light-shielding cover on a film gate thereon, wherein an opening and closing member which opens and closes the light-shielding cover of the film cartridge, an operation section formed on a camera cover corresponding in terms of position to the opening and closing member, and a paper cover which covers the operation section are provided.

A single-use camera in the second example of the invention is characterized in that a cutout for making the operation section to be accessible is formed on the paper cover in advance.

The third example of the invention is represented by a single-use camera which is loaded in advance, when it is assembled, with a film cartridge having a light-shielding cover on a film gate thereon housed in a cartridge chamber, wherein there are provided a hole for disassembling formed on a camera cover to enable a disassembling tool for disassembling the cartridge chamber to be inserted, and a mechanism to enable the disassembling tool to be inserted into the hole for disassembling by operating the light-shielding cover of the film cartridge to its closing position.

The third example of the invention is further represented by a single-use camera which is loaded in advance, when it is assembled, with a film cartridge having a light-shielding cover on a film gate thereon housed in a cartridge chamber, wherein there are provided a hole for disassembling formed on a camera cover to enable a disassembling tool for disassembling the cartridge chamber to be inserted, a stopper which regulates insertion of the disassembling tool into the hole for disassembling, an opening/closing member for opening and closing the light-shielding cover of the film cartridge and a stopper releasing member that releases the regulation of the stopper being interlocked with the closing operation of the opening/closing member.

The fourth example of the invention is represented by a single-use camera which is loaded in advance, when it is assembled, with a film cartridge having a light-shielding cover on a film gate thereon housed in a cartridge chamber, wherein there is provided an urging member that constantly urges the light-shielding cover of the film cartridge to be closed, and a latching member for holding the urging member at the position where the light-shielding cover is opened is formed on a disassembled member forming the cartridge chamber so that the holding at the position for opened light-shielding cover can be released by the disassembling operation of the disassembled member.

The fourth example of the invention is further represented by a single-use camera which is loaded in advance, when it is assembled, with a film cartridge having a light-shielding cover on a film gate thereon housed in a cartridge chamber, wherein there are provided an opening/closing member that opens and closes the light-shielding cover of the film cartridge, a disassembled member which has a stopper portion for regulating an operation of the opening/closing member in its closing direction and forms the cartridge chamber, and an urging member which constantly urges the opening/closing member to its closing direction, thus, the regulation for operation of the opening/closing member in its closing direction can be released by the stopper portion when disassembling the disassembled member.

The fifth example of the invention is represented by a single-use camera which is loaded in advance, when it is assembled, with a film cartridge having a light-shielding cover on a film gate thereon housed in a cartridge chamber, wherein there are provided a rotary member interlocking with the light-shielding cover of the film cartridge and a disassembled member which integrally houses a gear engaging with the rotary member and forms the cartridge chamber, thus, the disassembling operation of the disassembled member enables the gear to rotate the rotary member in its closing direction.

The fifth example of the invention is further represented by a single-use camera which is loaded in advance, when it is assembled, with a film cartridge having a light-shielding cover on a film gate thereon housed in a cartridge chamber, wherein there are provided an opening/closing member which opens and closes the light-shielding cover of the film cartridge and a disassembled member which integrally houses a gear engaging with the opening/closing member and forms the cartridge chamber, thus, the disassembling operation of the disassembled member enables the gear to operate the opening/closing member in its closing direction.

In the first example, the operation section is formed corresponding to the position of the opening/closing member which opens and closes the light-shielding cover of the film cartridge, and this operation section is covered by a paper cover.

In the second example, the operation section can be opened easily by tearing the paper cover along the perforation in a photofinishing laboratory.

In the third example, the disassembling tool can be inserted into the hole for disassembling by operating the light-shielding cover of the film cartridge to its closing position, and thereby it is possible to take out the film cartridge by inserting the disassembling tool into the hole for disassembling.

In the fourth example, when disassembling the disassembled member forming the cartridge chamber, holding of the light-shielding cover to its opened position is released to close the light-shielding cover, thereby the light-shielding cover is closed when taking out the film cartridge in a daylight room.

In the fifth example, when disassembling the disassembled member forming the cartridge chamber, the gear operates the opening/closing member in its closing direction, thus, the light-shielding cover is closed when taking out the film cartridge.

DETAILED DESCRIPTION OF THE INVENTION

Figure 1:
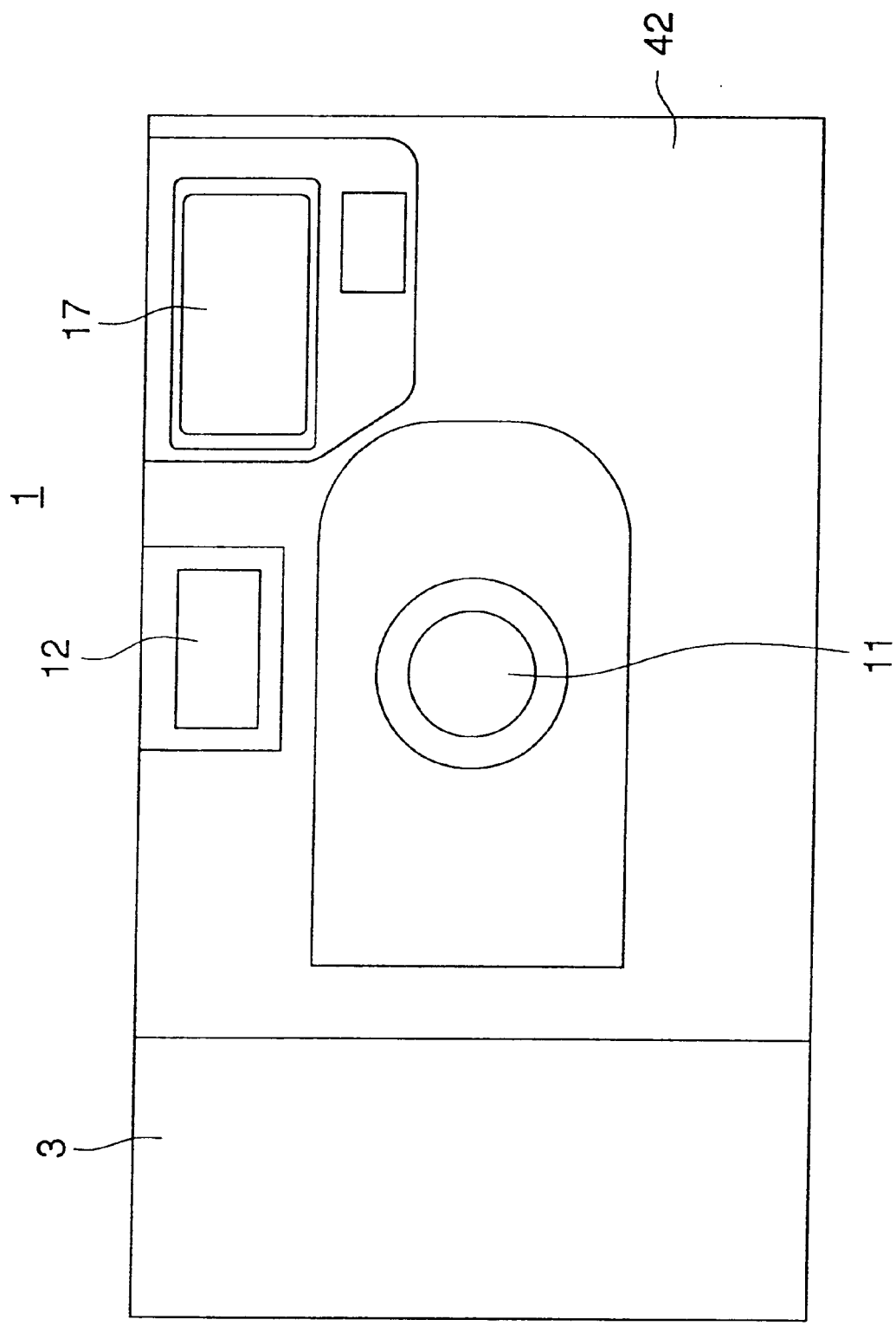
FIG. 1 is a front view of a single-use camera.
Figure 2:
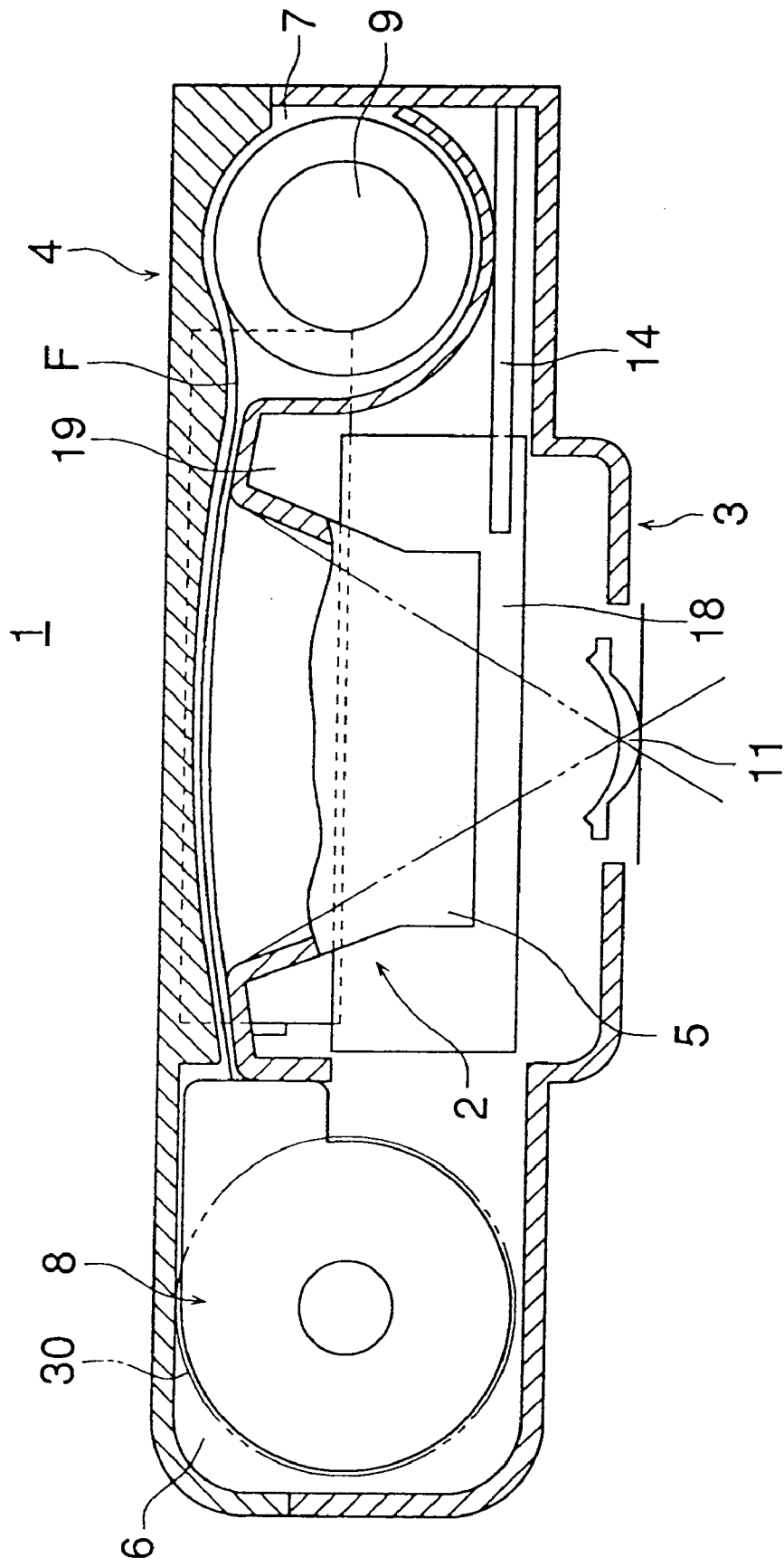
FIG. 2 is a plan view illustrating the internal structure of the single-use camera.
Figure 3:
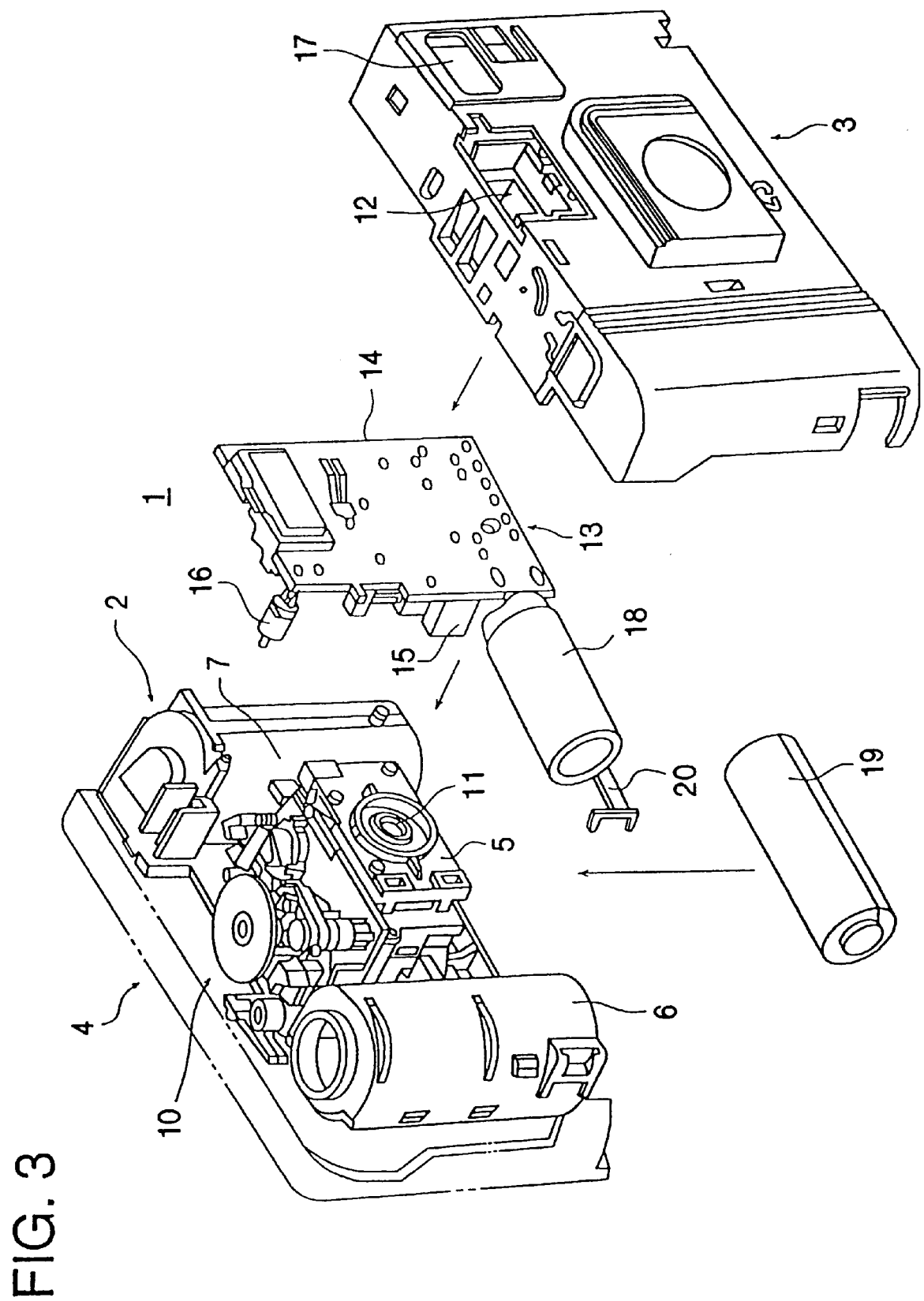
FIG. 3 is an exploded perspective view of the single-use camera.

A single-use camera will be explained as follows, referring to FIGS. 1–6. The single-use camera 1 is a simple camera loaded with a photographic film to be available on the market. A photographic film is loaded in a camera in the course of assembling step of the camera so that neither film loading nor film rewinding is required for a user, and a user can photograph immediately.

The single-use camera 1 is assembled in a way that front cover 3 and rear cover 4 are affixed on main body 2. At the central portion of the main body 2, there is provided photographing frame 5, and cartridge chamber 6 is provided on one side of the photographing frame 5 while film roll chamber 7 is provided on the other side thereof. In the cartridge chamber 6, there is loaded film cartridge 8, and in the film roll chamber 7, there is housed photographic film F that is wound around spool 9, and this photographic film F is taken up into the film cartridge 8 by film-winding mechanism 10 for each photographing.

The film-winding mechanism 10 is composed of film-winding knob 30 and others, and is positioned above the cartridge chamber 6 and the photographing frame 5. On the front side of the photographing frame 5, there is provided camera lens 11. Above the photographing frame 5, there is arranged view-finder 12.

On the single-use camera 1, there is provided strobe unit 13. Strobe base board 14 of the strobe unit 13 is affixed on the front side of the film roll chamber 7. The strobe base board 14 is wired with circuit element 15, and at upper position thereof, there is connected discharge tube 16 which faces strobe window 17 of the front cover 3. At the lower position of the strobe base board 14, there is connected main capacitor 18, and power supply battery 19 is connected to the strobe base board 14 through lead plate 20. Voltage charged in the main capacitor 18 by the power supply battery 19 causes the discharge tube 16 to emit light.

Figure 4:
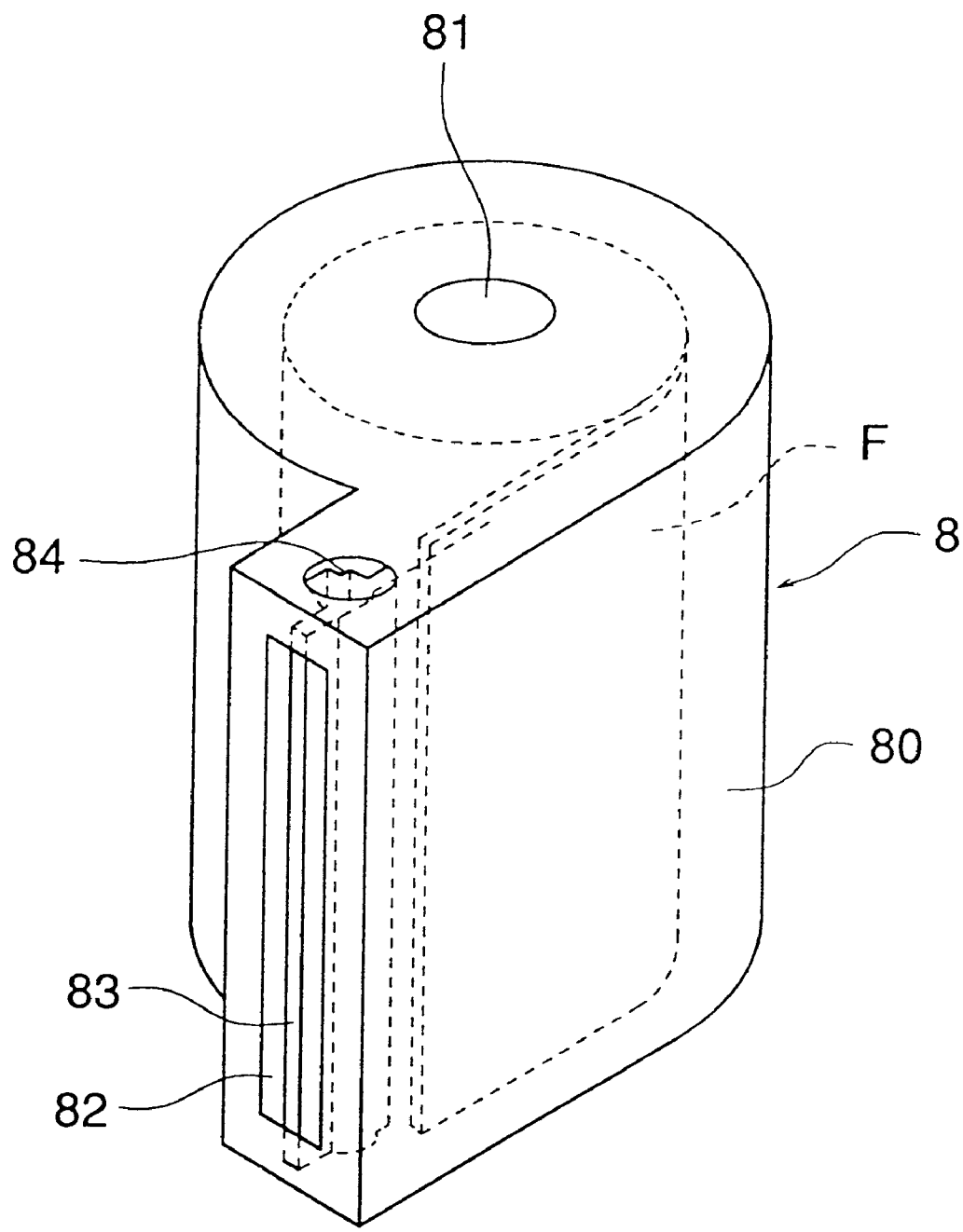
FIG. 4 is a perspective view showing a conventional film cartridge.

As shown in FIG. 4, film cartridge 8 is composed of cartridge main body 80, photographic film F wound around film-winding spool 81 and film-winding spool 81, and of light-shielding cover 83 which shields film gate 82 against light, and is structured as disclosed in Japanese Patent O.P.I. Publication No. 75336/1994. The light-shielding cover 83 is embedded rotatably in cartridge main body 80, and key 84 is formed on one end of the light-shielding cover 83.

Figure 5:
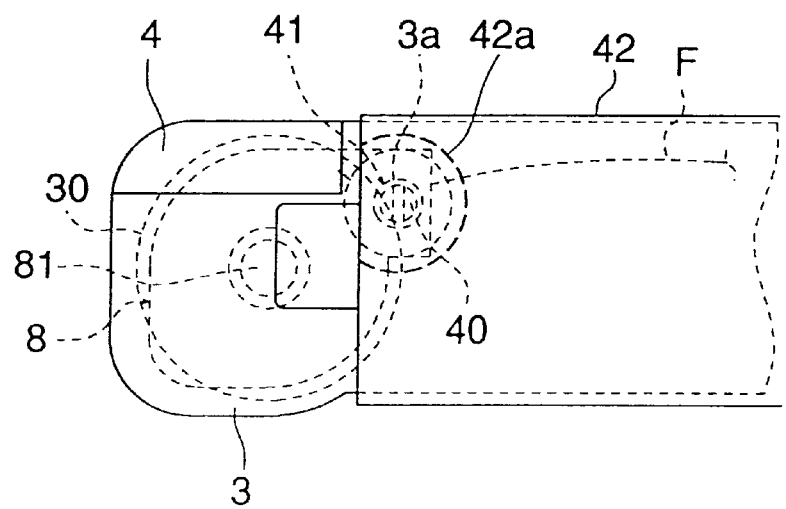
FIG. 5 is a plan view of an opened area of a single-use camera in the first example.
Figure 6:
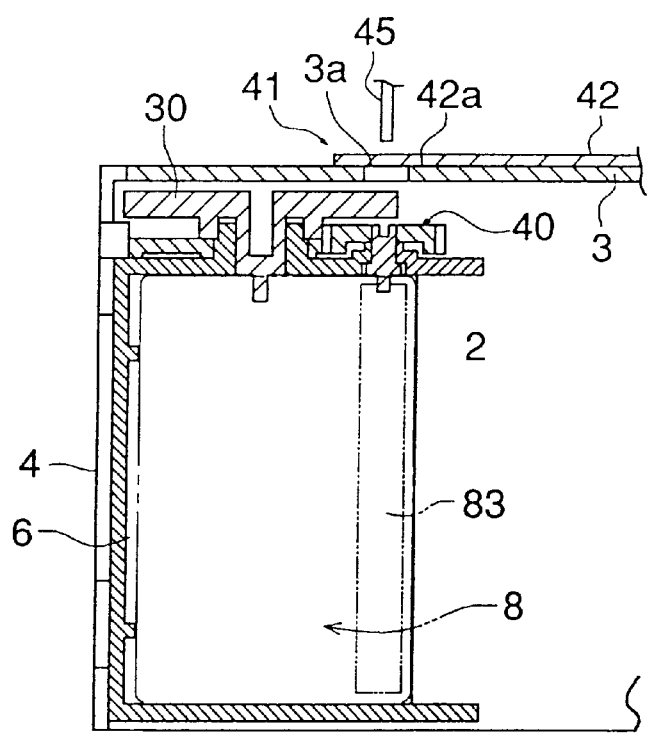
FIG. 6 is a sectional view of an opened area of a single-use camera in the first example.

In the first example, key 84 of the light-shielding cover 83 is engaged with opening/closing member 40 under the condition of being incorporated in main body 2. The opening/closing member 40 is pivoted rotatably on the main body 2 as shown in FIGS. 5 and 6. Corresponding to the position of the opening/closing member 40, there is formed on the front cover 3 through hole 3a which constitutes operation section 41, and tool 45 is inserted in the through hole 3a to turn the opening/closing member 40 toward its closing direction so that the light-shielding cover 83 may be closed. The through hole 3a is covered with paper cover 42 to prevent that a user turns the opening/closing member 40 toward its closing direction accidentally to close the light-shielding cover 83.

On the paper cover 42, there is formed in advance perforation 42a that is to be cut for disclosing the through hole 3a of the operation section 41. By tearing the paper cover 42 along the perforation 42a in a photofinishing laboratory, it is possible to disclose easily the through hole 3a of the operation section 41. Therefore, it is possible to insert tool 45 through the through hole 3a of the operation section 41 and to rotate the opening/closing member 40 in its closing direction to close the light-shielding cover 83 simply.

Next, the second example of a single-use camera will be explained as follows, referring to FIGS. 7–11.

Figure 7:
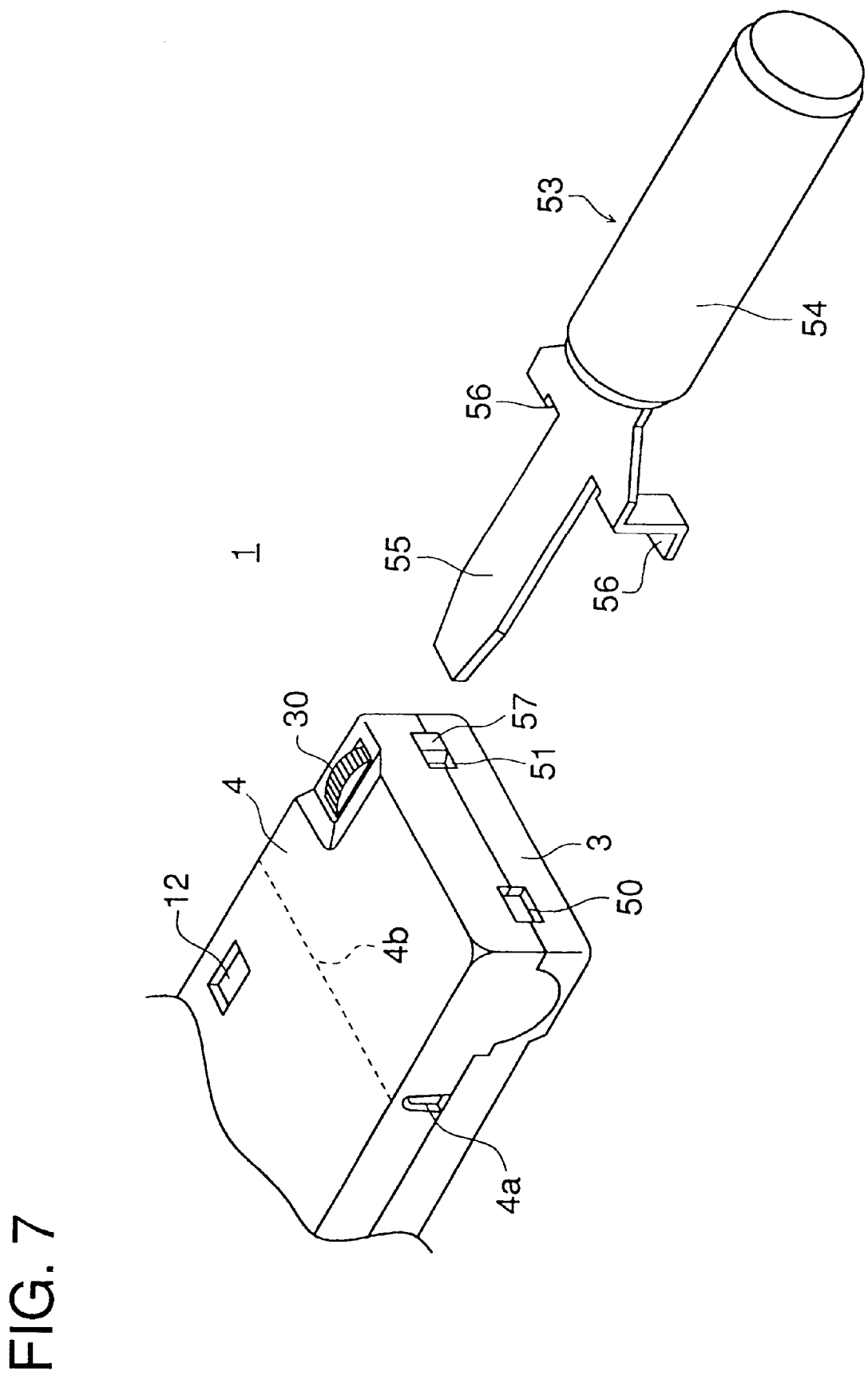
FIG. 7 is a perspective view showing a single-use camera in the second example and a disassembling tool.

FIG. 7 is a perspective view showing a single-use camera and a disassembling tool. On the upper and lower portions of the rear cover 4 of the single-use camera 1, there are formed notches 4a which are for disassembling a cartridge chamber and inside the rear cover 4, there is formed cutout groove 4b at the position shown with two-dot chain lines, so that the rear cover 4 can be folded outside at the position represented by these notches 4a and inside cutout groove 4b. On the side of a camera, there are formed recessed portions for disassembling 50 and 51 between the front cover 3 and the rear cover 4.

Disassembling tool 53 is provided with handle portion 54, lever portion 55 and a pair of claw portions 56. For disassembling the single-use camera 1, a pair of claw portions 56 of the disassembling tool 53 are inserted in recessed portions for disassembling 50 and 51 on the side of a camera to open the rear cover 4 outside with the lever portion 55 serving as a fulcrum. Since stopper 57 for preventing insertion of claw portions 56 of the disassembling tool 53 is showing at a part of recessed portion 51 on the upper portion of a camera, the claw portions 56 of the disassembling tool 53 can not be inserted unless the stopper 57 is removed.

Figure 8:
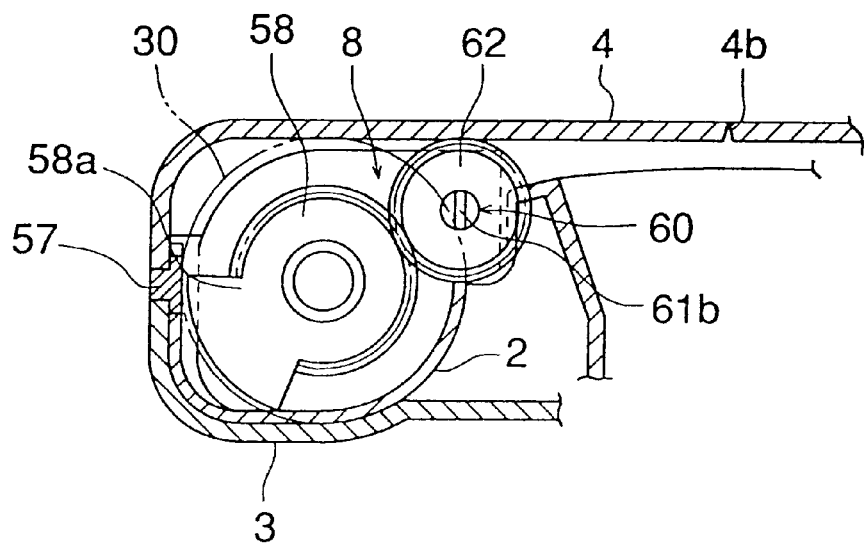
FIG. 8 is a plan view of an opened area in the second example.
Figure 9:
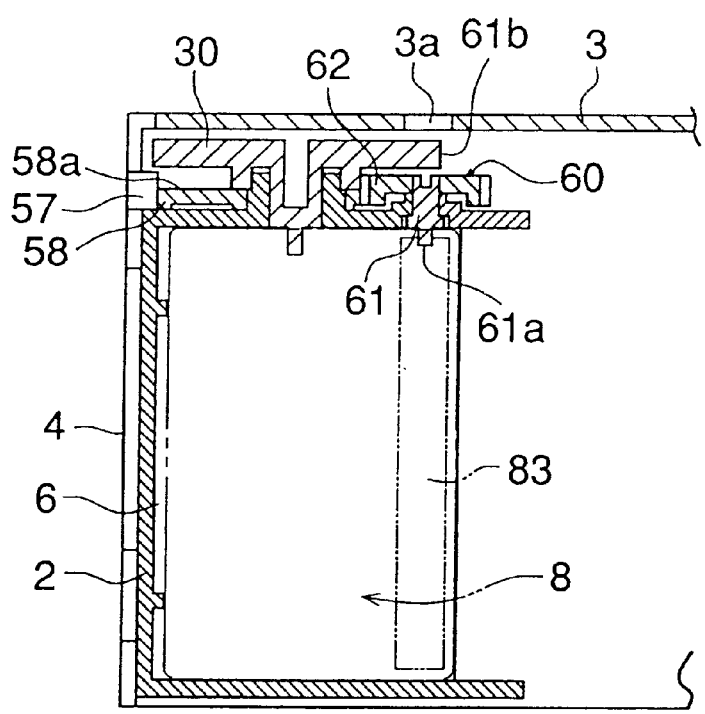
FIG. 9 is a sectional view of an opened area in the second example.
Figure 10:
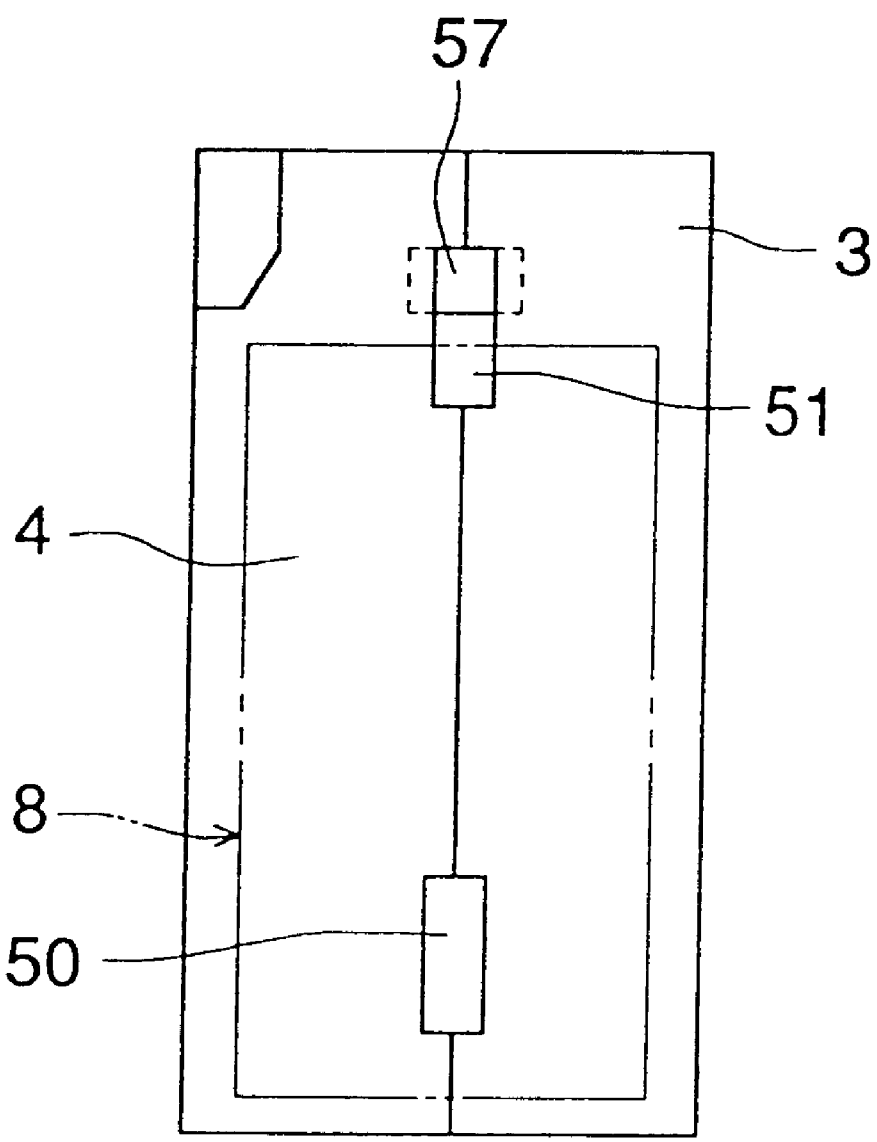
FIG. 10 is a side view of an opened area.

FIG. 8 is a plan view of an opened area, FIG. 9 is a sectional view of the opened area, and FIG. 10 is a side view of the opened area. FIGS. 8–10 show the state wherein the light-shielding cover 83 of the film cartridge 8 is opened. When the light-shielding cover 83 is opened, the stopper 57 is held by fan-shaped protruded portion 58a of stopper releasing member 58 which has a gear on its outer circumferential surface and is fit rotatably. Therefore, the stopper 57 prevents the claw portion 56 of the disassembling tool 53 from being inserted in the recessed portion 51.

In opening/closing member 60 that opens and closes the light-shielding cover 83, shaft portion 61 and gear portion 62 are engaged with each other to be united solidly. The shaft portion 61 is pivoted rotatably on main body 2, and tip portion 61a of the shaft portion 61 is engaged with the light-shielding cover 83. On the top of the shaft portion 61, there is formed key 61b into which tool 45 such as a screwdriver is inserted from the outside of a camera through the through hole 3a to turn the shaft portion 61 of the opening/closing member 60 in its closing direction for closing the light-shielding cover 83. The gear portion 62 of the opening/closing member 60 is engaged with a gear portion of stopper releasing member 58.

Figure 11:
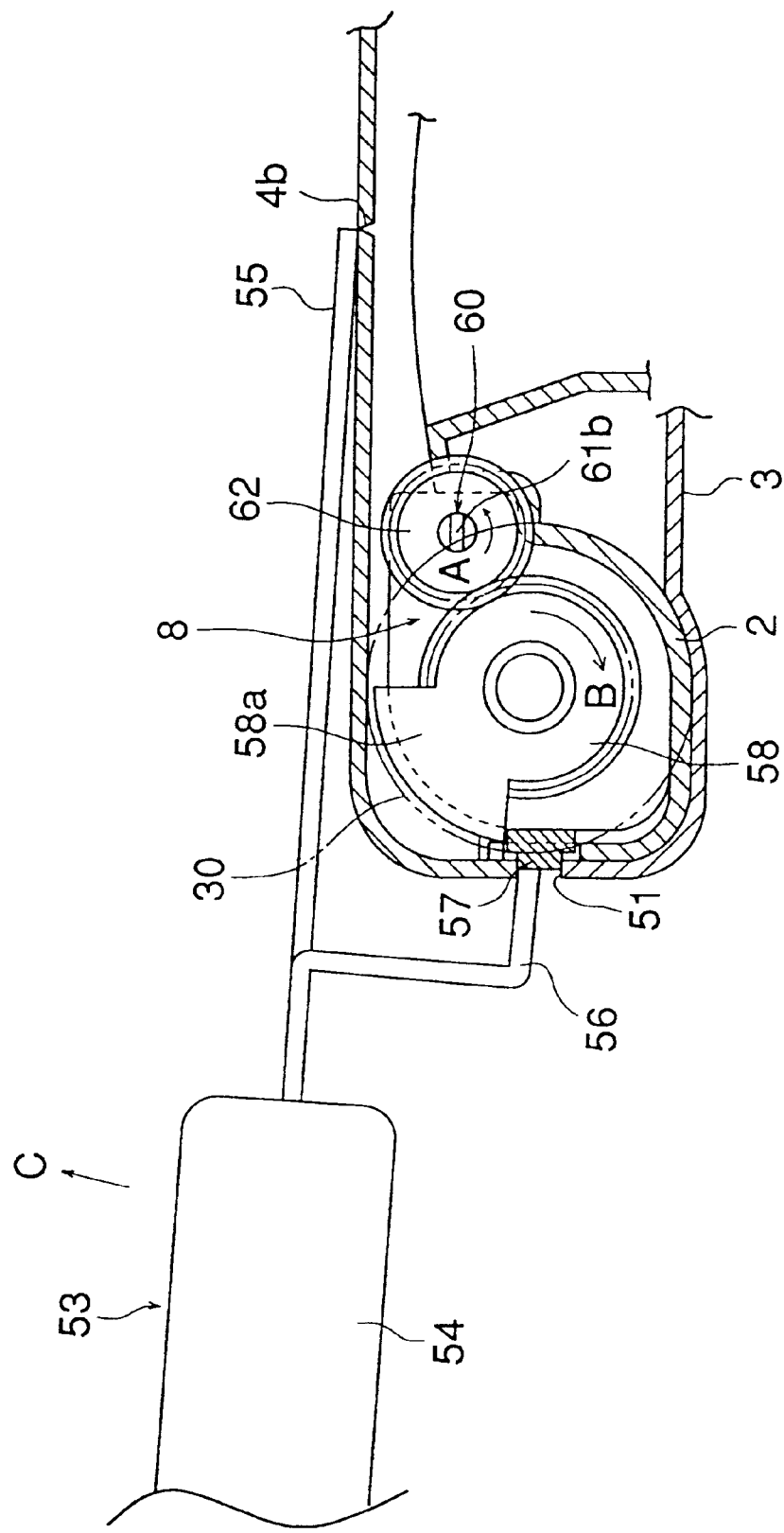
FIG. 11 is a sectional view showing how the single-use camera in the second example is disassembled.

FIG. 11 is a sectional view showing how a single-use camera is disassembled. In the case of disassembling a single-use camera, when tool 45 such as a screwdriver is engaged with key 61b of the shaft portion 61 of the opening/closing member 60 to turn it in the direction of arrow A, the light-shielding cover 83 is closed. Interlocking with this, the gear portion 62 of the opening/closing member 60 rotates in the direction of arrow A. Therefore, the stopper releasing member 58 which is engaged with the gear portion 62 is rotated in the direction of arrow B, and protruded portion 58a comes off the stopper 57. The protruded portion 58a holds the stopper 57 until the moment when the light-shielding cover 83 is closed.

Under the condition that the protruded portion 58a is not holding the stopper 57, claw portion 56 of disassembling tool 53 pushes away the stopper 57 and is inserted in hole portion for disassembling 51. When the disassembling tool 53 is pulled in the direction of arrow C, the rear cover 4 is opened by the claw portion 56 with lever portion 55 serving as a fulcrum, enabling film cartridge 8 to be taken out.

Figure 12:
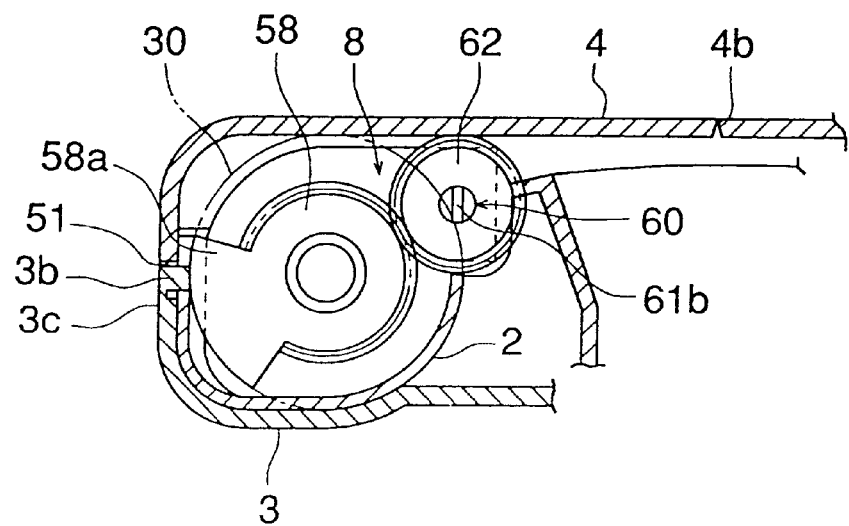
FIG. 12 is a plan view of an opened area in the third example.
Figure 13:
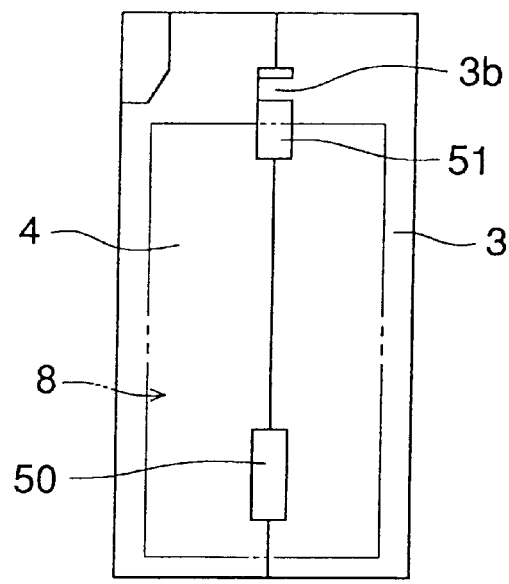
FIG. 13 is a side view of an opened area in the third example.
Figure 14:
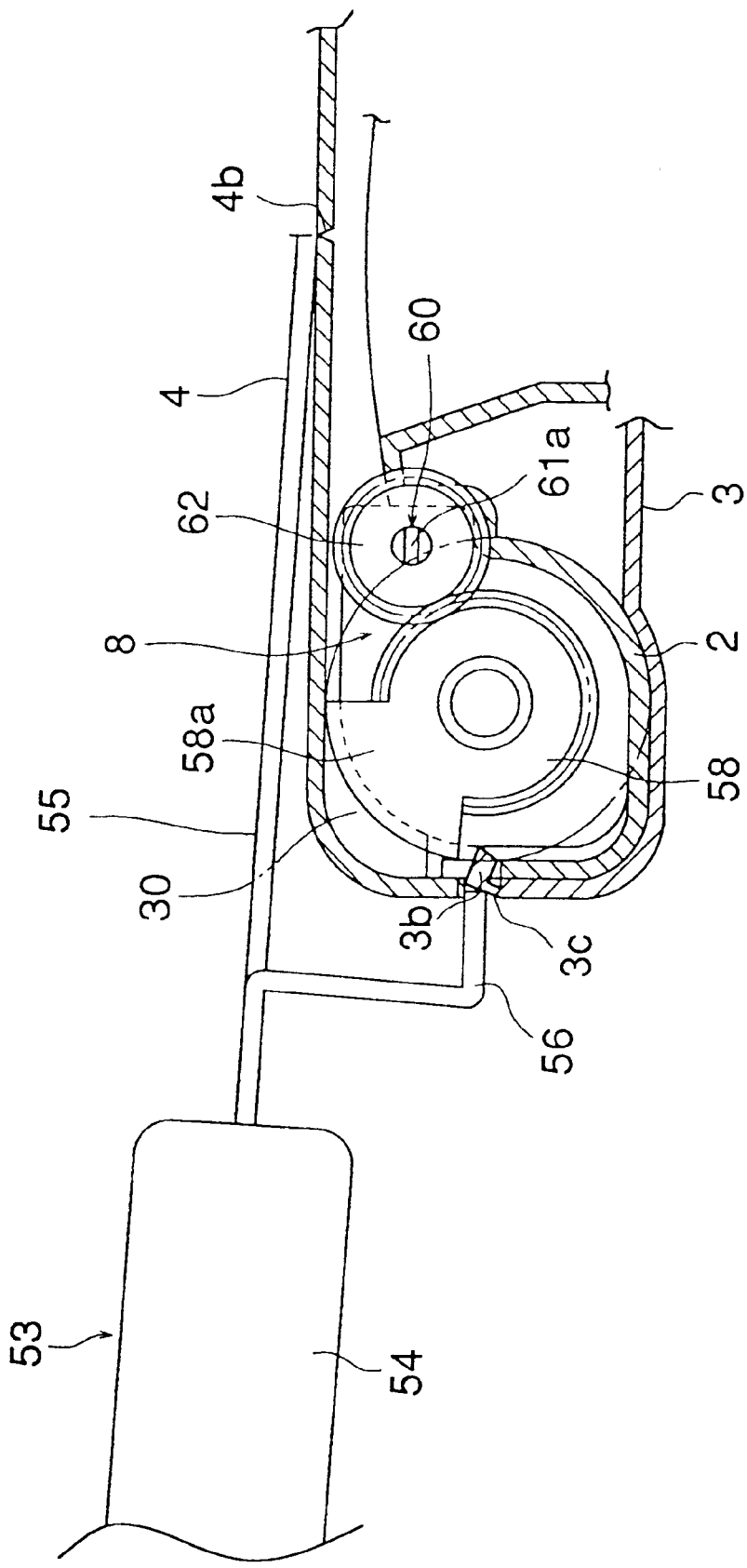
FIG. 14 is a sectional view showing how the single-use camera in the third example is disassembled.

Next, the third example of a single-use camera will be explained as follows, referring to FIGS. 12–14. FIG. 12 is a plan view of an opened portion, FIG. 13 is a side view of the opened portion and FIG. 14 is a sectional view showing how a single-use camera is disassembled.

This example has the same effect due to protruded portion 3b formed integrally with the front cover 3 which is provided in place of the stopper 57 formed separately as shown in FIGS. 7–11. Namely, the protruded portion 3b which serves as a stopper is held by thin portion 3c, and it is bent on the thin portion 3c when the claw portion 56 of the disassembling tool 53 is inserted as shown in FIG. 14 under the condition that the protruded portion 58a of the stopper releasing member 58 does not support, thus, it has the same function as that of the stopper 57 shown in FIGS. 7–11. Since the protruded portion 3b is formed integrally with the front cover 3, it is advantageous in terms of cost and assembling. Further, it is also possible that the protruded portion 3b is formed integrally with a part of the rear cover 4. In that case, it is also advantageous in terms of cost and assembling.

Figure 15:
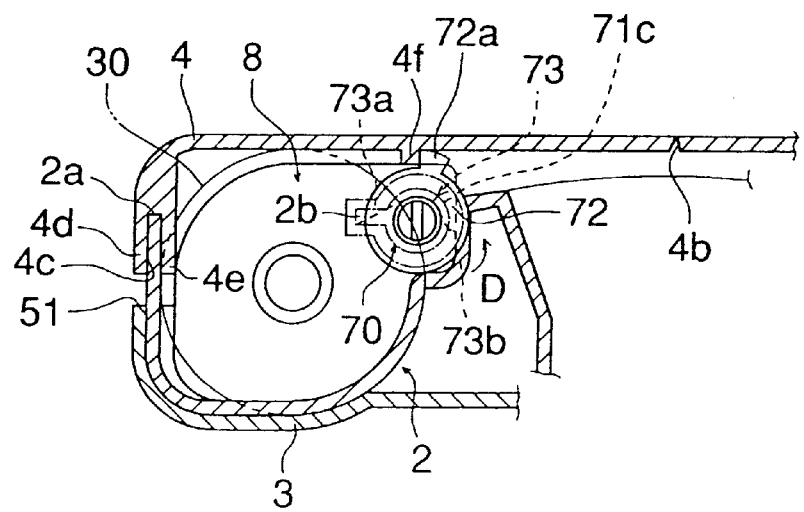
FIG. 15 is a plan view of an opened area in the fourth example.
Figure 16:
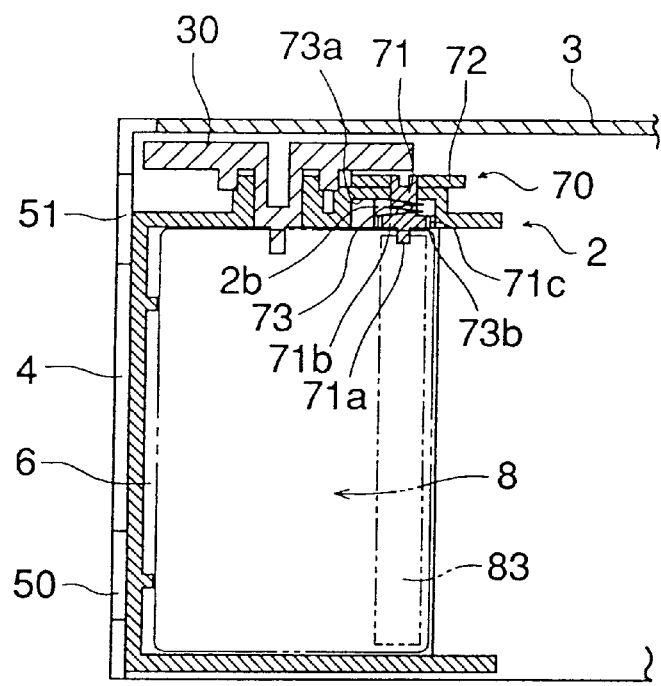
FIG. 16 is a side view of an opened area in the fourth example.
Figure 17:
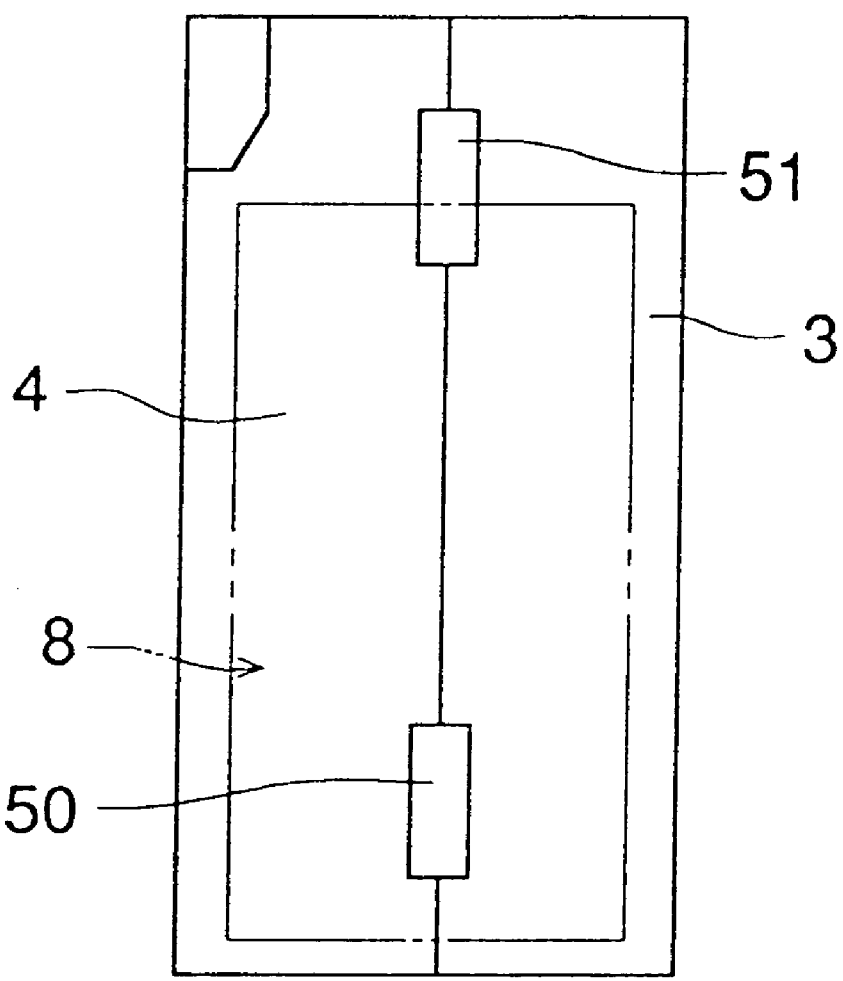
FIG. 17 is a side view of an opened area in the fourth example.
Figure 18:
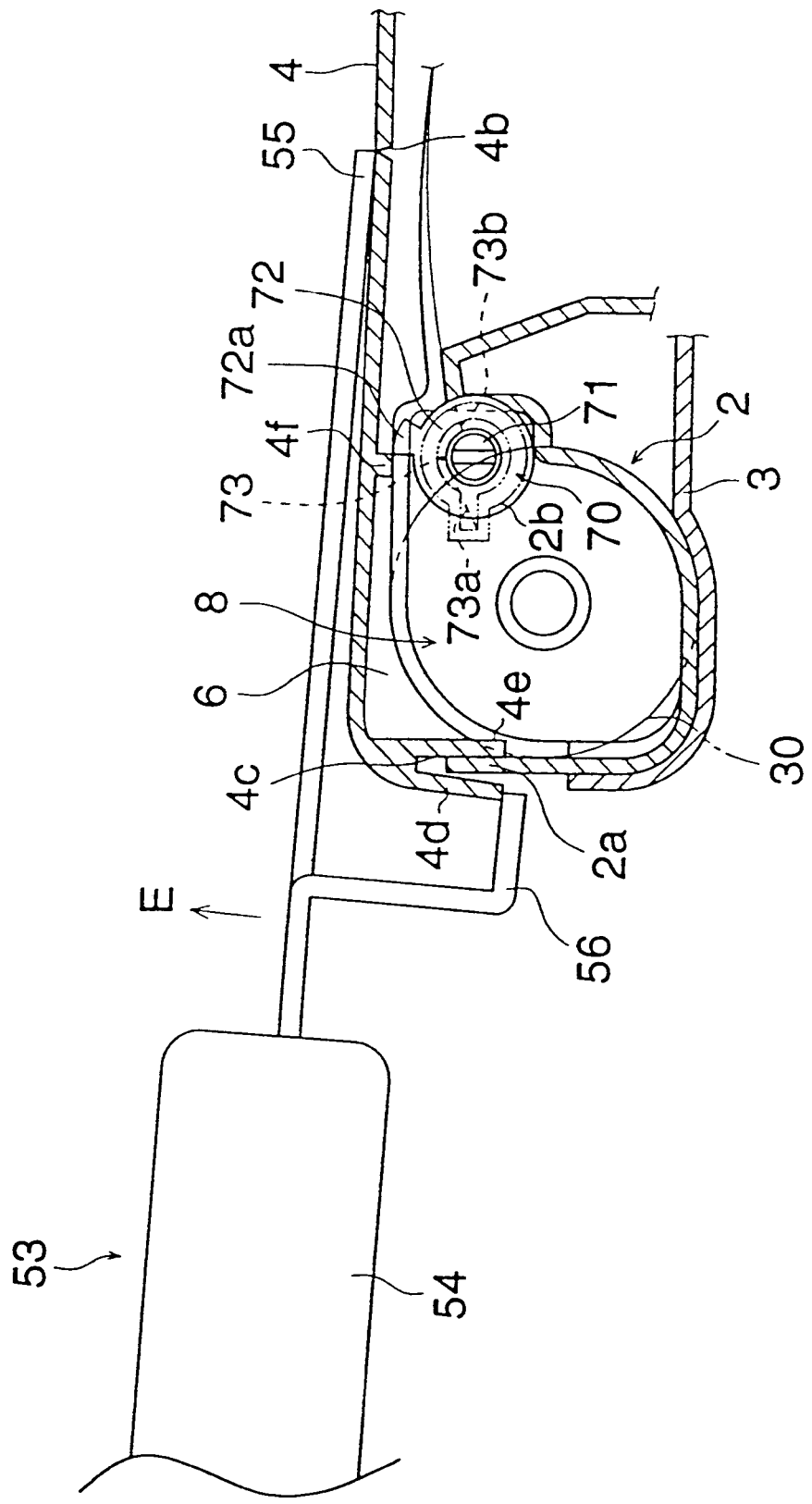
FIG. 18 is a sectional view showing how the single-use camera in the fourth example is disassembled.
Figure 19:
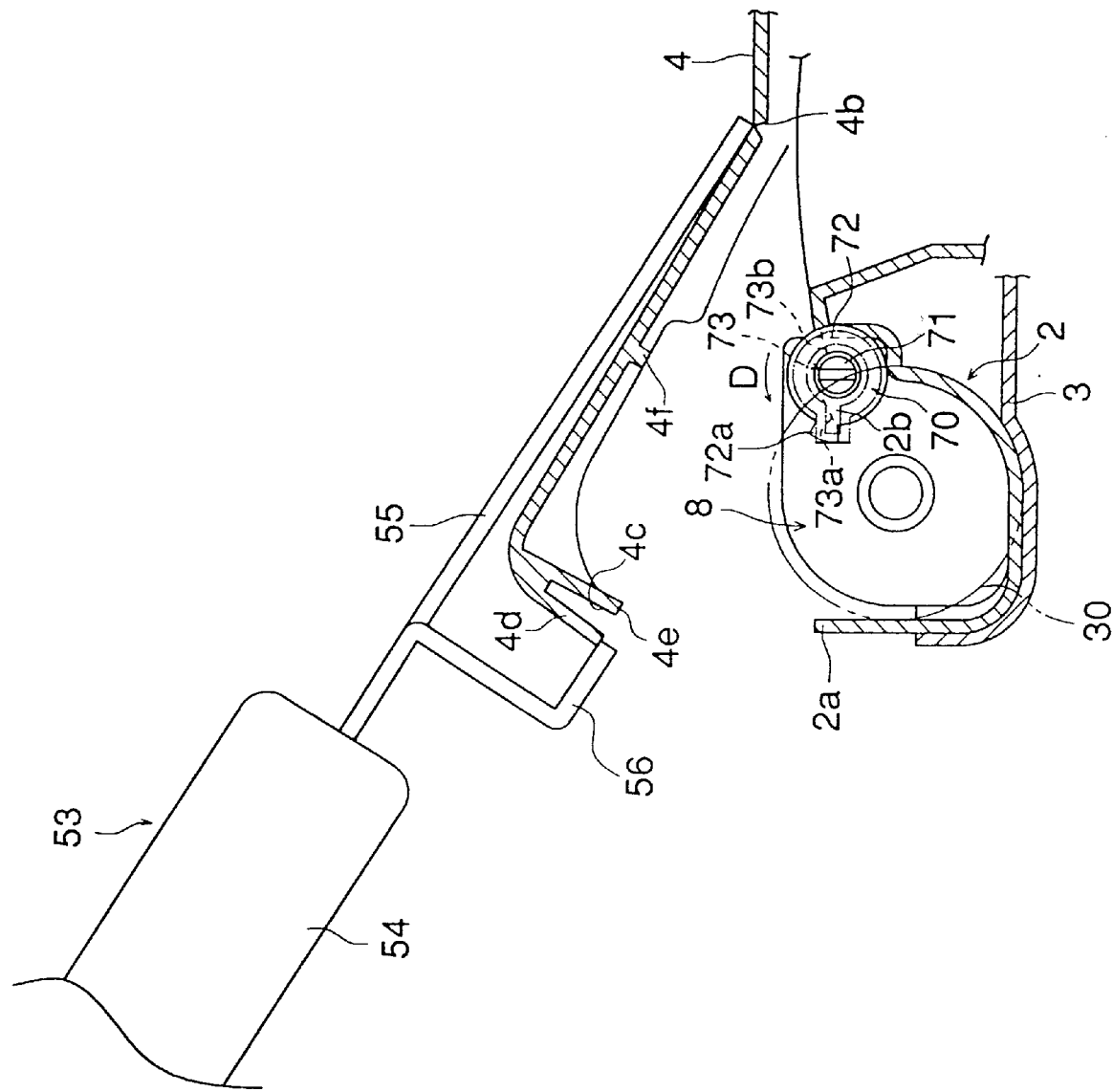
FIG. 19 is a sectional view showing how the single-use camera in the fourth example has been disassembled.

Further, the fourth example of a single-use camera will be explained as follows, referring to FIGS. 15–19. FIG. 15 is a plan view of an opened portion, FIG. 16 is a sectional view of the opened portion, FIG. 17 is a side view of the opened portion, FIG. 18 is a sectional view showing how a single-use camera is disassembled, and FIG. 19 is a sectional view showing the disassembled single-use camera.

On the rear cover 4 of the single-use camera 1, labyrinth groove 4c forms ribs 4d and 4e on the side end portion, and rib 2a on the side end portion of the main body 2 is engaged with the labyrinth groove 4c for shielding light. On the inside of the rear cover 4, there is formed stopper portion 4f. In the opening/closing member 70 for opening and closing the light-shielding cover 83, the shaft portion 71 and selector portion 72 are engaged with each other to be unified, and the shaft portion 71 is pivoted rotatably on the main body 2. Tip portion 71a of the shaft portion 71 is engaged with the light-shielding cover 83, and protruded portion 72a provided on the selector portion 72 is in contact with stopper portion 4f.

On the shaft portion 71, there is formed flange portion 71b, and on the shaft portion 71, there is provided spring 73 whose one end 73a is hooked on spring latch 2b formed on the main body 2, while the other end portion 73b of the spring 73 is hooked on spring hooking hole 71c opened on the flange portion 71b. The opening/closing member 70 is constantly urged in the direction of arrow D by the spring 73.

Urging of the opening/closing member 70 made by the spring is held at the opened position of the light-shielding cover 83, with the protruded portion 72a provided on the selector portion 72 being in contact with the stopper portion 4f provided on the rear cover 4.

When disassembling operation by disassembling tool 53 is started, the rear cover is swung in the direction of arrow E around notch groove 4b formed on the internal surface of the rear cover 4 as shown in FIG. 18, and the rear cover 4 is lifted. Due to this movement, the stopper portion 4f of the rear cover 4 is disengaged from the protruded portion 72a provided on the selector portion 72 of the opening/closing member 70, causing the opening/closing member 70 to be held in its marginal position. In this case, light-shielding for cartridge chamber 6 is still secured by rib 2a of the main body and ribs 4d and 4e of the rear cover 4, and the state of light-shielding remains unchanged until the stopper portion 4f comes off the protruded portion 72a completely, and the opening/closing member 70 is rotated in the closing direction of arrow D by the spring 73 to close the light-shielding cover 83.

Figure 20:
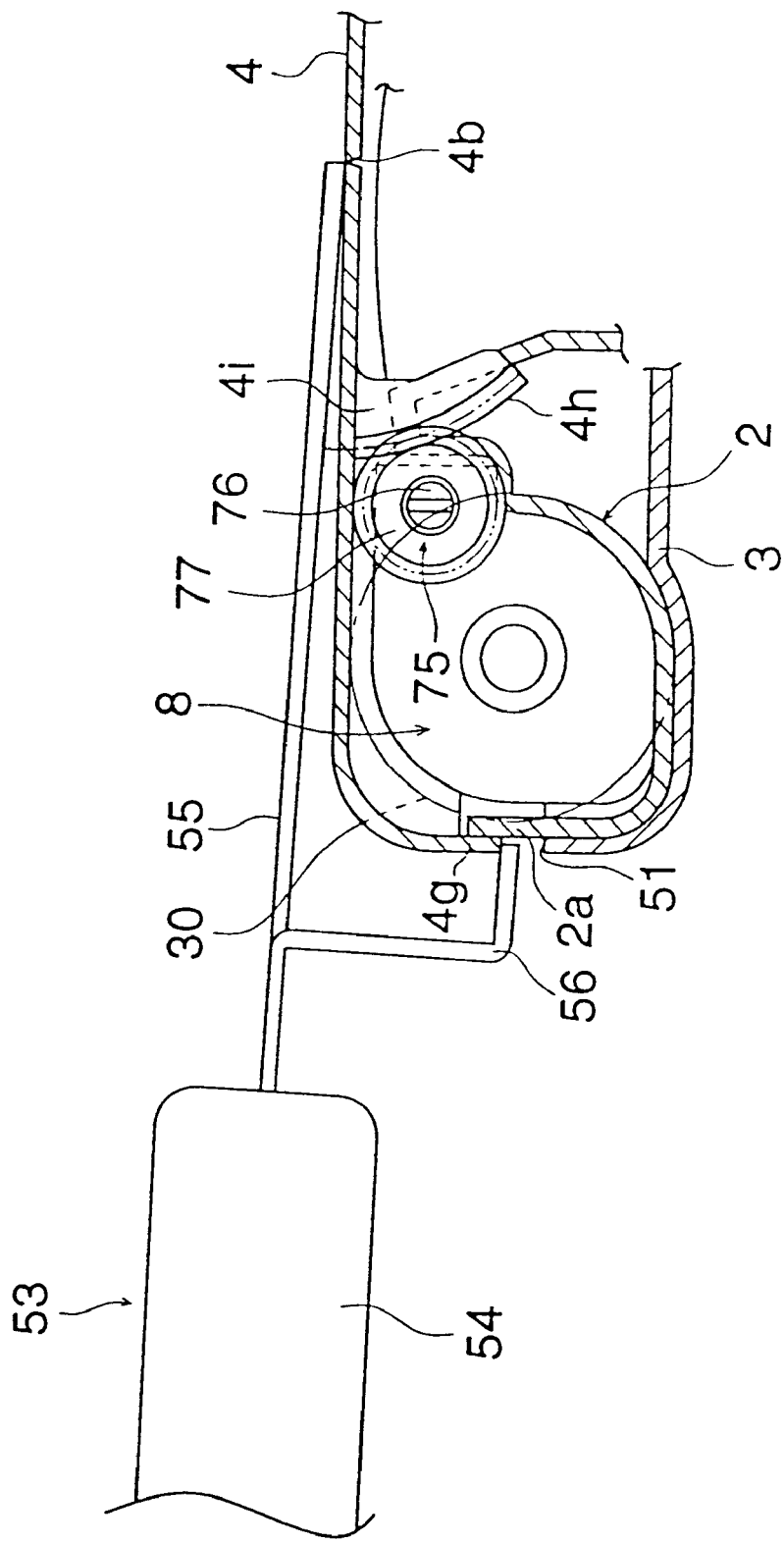
FIG. 20 is a plan view of an opened area showing how a single-use camera in the fifth example is disassembled.
Figure 21:
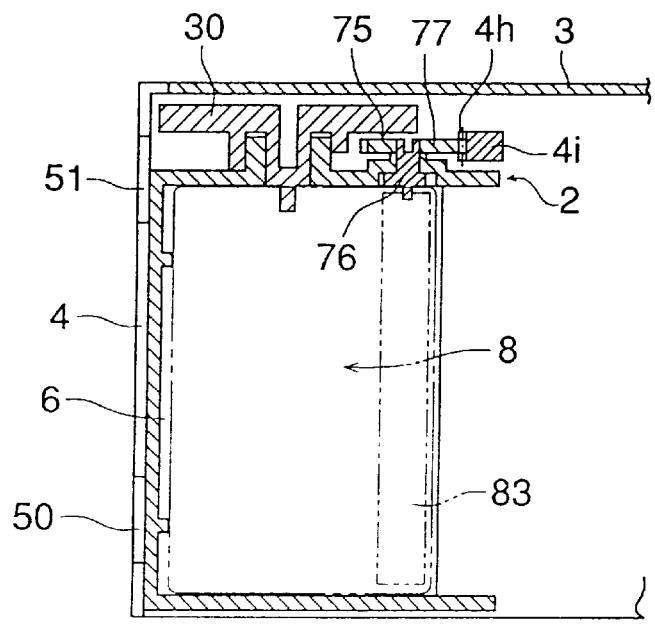
FIG. 21 is a sectional view of an opened area in the fifth example.
Figure 22:
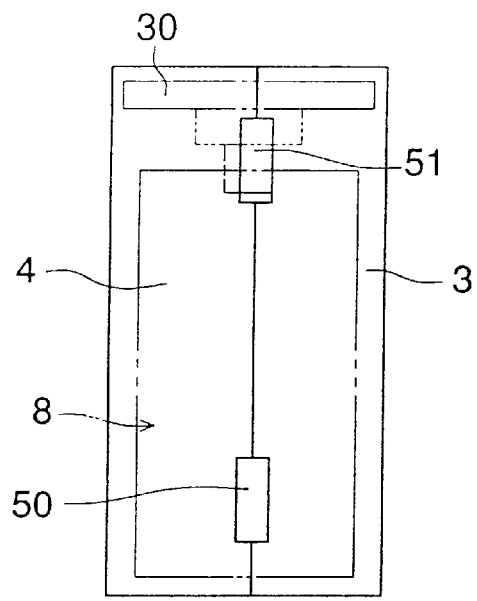
FIG. 22 is a side view of an opened area in the fifth example.
Figure 23:
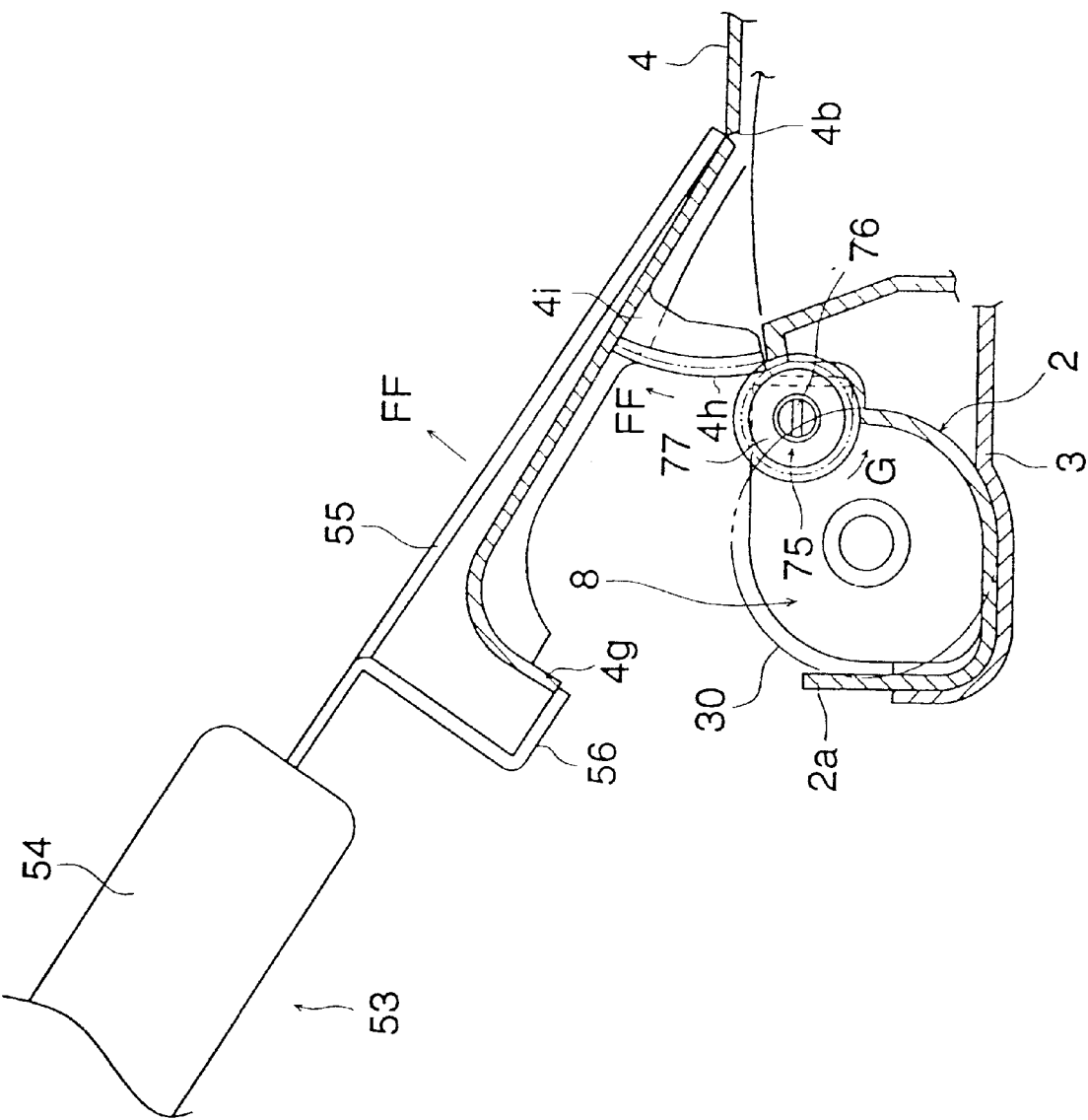
FIG. 23 is a sectional view showing how the single-use camera in the fifth example has been disassembled.

Further, the fifth example of a single-use camera will be explained as follows, referring to FIGS. 20–23. FIG. 20 is a plan view of an opened portion showing how a single-use camera is disassembled, FIG. 21 is a sectional view of the opened portion, FIG. 22 is a side view of the opened portion, and FIG. 23 is a sectional view showing the disassembled single-use camera.

On the rear cover 4 of the single-use camera 1, rib 4g is formed on the side end portion, and rib 2a of the main body 2 is engaged with the rib 4g for shielding light. On the inside of the rear cover 4, there is formed fan-shaped gear 4h, which is oriented to cutout groove 4b as the center, on protruded portion 4i of the rear cover 4. Opening/closing member 75 is formed by shaft portion 76 and gear portion 77 and coupled with a gear formed on the circumference of the gear portion 77 and with gear 4h of the protruded portion 4i on the rear cover 4 so as to keep light-shielding cover 83 stay at an open position. The shaft portion 76 of the opening/closing member 75 is rotatably supported on the main body 2.

By the rotation of the disassembling tool 53 to the direction of arrow F, the gear 4h of the rear cover 4 rotates in the same way, the opening/closing member, 75 being engaged thereto, is rotated to the direction of arrow G which is the direction to close the light-shielding cover 83, the light-shielding cover 83 is rotated for a predetermined angle, and an operation is finished by disengaging the gears from each other.

As stated above, in the first example, an operation section that operates to close a light-shielding cover is formed to correspond the position of an opening/closing member which opens and closes a light-shielding cover of a film cartridge. However, an operation of a user to close the light-shielding cover accidentally and carelessly can be prevented by a paper cover because the operation section is covered with a paper cover.

In the second example, since perforations to be cut for opening an operation section are formed on a paper cover, it is possible to open the operation section easily by cutting the paper cover along the perforations, and to operate for closing a light-shielding cover simply through the operating section.

In the third example, it is possible to insert a disassembling tool into a disassembling hole for disassembling and thereby to take out a cartridge, after closing a light-shielding cover of a film cartridge, which prevents in advance an accident caused by forgetting to close a light-shielding cover in a photofinishing laboratory.

In the fourth example, when parts to be disassembled and forming a cartridge chamber are disassembled, a light-shielding cover is closed. Therefore, when taking out a cartridge in a daylight room, a light-shielding cover is closed, which prevents in advance an accident caused by forgetting to close a light-shielding cover in a photofinishing laboratory, and makes it possible to take out a film cartridge surely and easily without increasing workhours.

In the fifth example, when parts to be disassembled and forming a cartridge chamber are disassembled, a gear operates a light-shielding cover to its closing direction. Therefore, when taking out a cartridge, a light-shielding cover is closed, which prevents in advance an accident caused by forgetting to close a light-shielding cover in a photofinishing laboratory, and makes it possible to take out a film cartridge surely and easily without increasing workhours.

What is claimed is:

1. A single-use camera comprising:

a main body;

a chamber positioned in said main body;

a film cartridge positioned in said chamber, said film cartridge having a film gate and a light-shielding cover positioned in said film gate, said light-shielding cover movable between an open position and a closed position;

a cover member surrounding said main body and a portion of said cover member movable between an open position and a closed position, said portion of said cover member covering said film cartridge in said chamber when said cover member is in said closed position, and allowing access to said film cartridge when said portion of said cover member is in said open position;

a closing member mounted on said main body for closing said light-shielding cover of said film cartridge;

an urging member mounted on said main body for urging said closing member to move said light-shielding cover to said closed position; and a stopper member being in contact with said closing member and keeping said closing member in a position wherein said light-shielding cover is in said open position;

wherein when said portion of said cover member is moved from said closed position to said open position, said stopper member is disengaged from said closing member by force to move said portion of said cover member from said closed position to said open position, and said closing member is urged by said urging member so that said light-shielding cover of said film cartridge is moved to said closed position.

2. The single-use camera of claim 1, wherein said stopper member keeps said closing member in a position by having a direct contact with said closing member for resisting the urging of said urging member.

* * * * *